United States Patent
Kuhlmann (10) Patent No.: US 11,097,820 B2
(45) Date of Patent: Aug. 24, 2021

(54) RIGID SAIL FOR VESSELS, IN PARTICULAR LARGE SHIPS, AND VESSEL WITH A RIGID SAIL

(71) Applicant: Becker Marine Systems GmbH, Hamburg (DE)

(72) Inventor: Henning Kuhlmann, Hamburg (DE)

(73) Assignee: Becker Marine Systems GmbH, Hamburg (DE)

( * ) Notice: Subject to any disclaimer, the term of this patent is extended or adjusted under 35 U.S.C. 154(b) by 0 days.

(21) Appl. No.: 16/790,990

(22) Filed: Feb. 14, 2020

(65) Prior Publication Data

US 2020/0262531 A1 Aug. 20, 2020

(30) Foreign Application Priority Data

Feb. 18, 2019 (DE) .......................... 202019100897.0
May 24, 2019 (DE) .......................... 202019102941.2

(51) Int. Cl.
*B63H 9/04* (2020.01)
*B63H 9/061* (2020.01)

(52) U.S. Cl.
CPC ................................. *B63H 9/0621* (2020.02)

(58) Field of Classification Search
CPC ... B63H 9/00; B63H 9/04; B63H 9/06; B63H 9/061; B63H 9/0621; B63H 9/0635; B63H 9/067
USPC ... 114/102.1, 102.16, 102.17, 102.2, 102.22, 114/102.29, 102.32, 102.33
See application file for complete search history.

(56) References Cited

U.S. PATENT DOCUMENTS

| 5,799,601 | A | * | 9/1998 | Peay | B63H 9/08 |
| | | | | | 114/98 |
| 5,896,825 | A | * | 4/1999 | Trefethen | B63B 39/062 |
| | | | | | 114/39.28 |
| 6,341,571 | B1 | * | 1/2002 | Russell | B63B 1/125 |
| | | | | | 114/39.21 |
| 6,953,000 | B2 | * | 10/2005 | Fink | B63H 9/06 |
| | | | | | 114/102.1 |
| 9,422,043 | B2 | * | 8/2016 | Englebert | B63H 9/069 |
| 10,029,773 | B1 | * | 7/2018 | Todter | B63B 1/107 |
| 10,246,172 | B2 | * | 4/2019 | Arendts | B63H 9/061 |

(Continued)

FOREIGN PATENT DOCUMENTS

| DE | 405701 C | 11/1924 |
| EP | 2 366 621 A2 | 9/2011 |
| FR | 3 029 888 A1 | 6/2016 |

(Continued)

*Primary Examiner* — Daniel V Venne
(74) *Attorney, Agent, or Firm* — Kelly & Kelley, LLP (57) ABSTRACT

In order to provide a rigid sail or aerofoil sail which has a lower overall weight, is cost-effective to manufacture and does not affect the passing under bridges, power lines or similar structures arranged over busy waters, in the case of a rigid sail for vessels, in particular, for large ships, such as bulk carriers, tankers, car transporters or bulkers, comprising a mast and a first aerofoil wing body mounted on the mast with a base and a head, wherein the mast is inserted through the base into the first aerofoil wing body and is arranged within the first aerofoil wing body, it is proposed that the mast, starting from the base, does not extend beyond a maximum height of the first aerofoil wing body, in particular, less than 75% of the maximum height.

17 Claims, 4 Drawing Sheets

(56) References Cited

U.S. PATENT DOCUMENTS

2015/0033998 A1    2/2015  Englebert et al.
2015/0158569 A1    6/2015  Decamp

FOREIGN PATENT DOCUMENTS

| | | | |
|---|---|---|---|
| JP | S58-12895 A | 1/1983 | |
| JP | S59-11100 U | 1/1984 | |
| JP | 2012-240539 A | 12/2012 | |
| WO | 2013/070070 A1 | 5/2013 | |
| WO | WO-2013070070 A1 * | 5/2013 | ............ B63H 9/069 |
| WO | 2014/001824 A1 | 1/2014 | |
| WO | 2014/053029 A1 | 4/2014 | |
| WO | 2018/087649 A1 | 5/2018 | |

* cited by examiner

RIGID SAIL FOR VESSELS, IN PARTICULAR LARGE SHIPS, AND VESSEL WITH A RIGID SAIL

The present invention relates to a rigid sail for vessels, in particular for large ships such as bulk carriers, tankers, car transporters or bulkers, comprising a mast and a first aerofoil wing body mounted on the mast with a base and a head, wherein the mast is inserted through the base into the first aerofoil wing body and is arranged within the first aerofoil wing body. Furthermore, the present invention relates to a vessel with a rigid sail.

TECHNOLOGICAL BACKGROUND

Rigid sails, also called aerofoil sails, are being proposed more and more frequently as auxiliary propulsion systems, even for large ships. A rigid sail or aerofoil sail comprises an aerofoil wing body, meaning an aerodynamic structure that is mounted on a vessel instead of a conventional sail. Rigid sails or aerofoil sails act analogously to aircraft wings and usually have a rigid or solid outer shell. By using rigid sails or aerofoil sails in ships, in particular, large ships, an additional propulsive power can be provided, which can reduce the fuel consumption and exhaust emissions of the ship.

WO 2014/001824 A1 discloses an aerofoil sail or rigid sail comprising a front aerofoil wing section, a rear aerofoil wing section and a strut, wherein at least one of the aerofoil wing sections can be pivoted. The aerofoil sail comprises a control system in order to adjust the individual angle adjustment relative to the strut of at least one aerofoil wing section.

WO 2018/087649 A1 discloses a ship, which is at least partially propelled by a sail, wherein the sail has a rotatably arranged double sail. The double sail includes a front wing and a rear wing, which are separated by a gap.

WO 2014/053029 A1 discloses a rigid sail or a rigid wing to be attached to a vessel. The rigid sail comprises a pair of elongated stiff panels and a hinge element, which is designed to couple the panels to each other and allow for a pivot movement of the two panels relative to each other to take place.

EP 2 366 621 A2 relates to a sail unit comprising a rigid sail assembly with a plurality of rigid sail sections. The rigid sail sections have a hollow wing profile and are arranged vertically on top of each other, so that, with the exception of the lowest section, any overhead section can be retracted into an underlying section.

From US 2015/0158569 A1, a propelling wing for a vessel is known, comprising a sail and a mast, which forms the leading edge of the propelling wing. The mast and the propelling wing are segmented. The propelling wing has at least two fins, which are moveable.

Rigid sails or aerofoil sails to be provided for large ships must have correspondingly large dimensions. As a result, the rigid sails are exposed to extremely high aerodynamic loads. In prior art, therefore, particularly stable masts are used, which extend across the entire height of the aerofoil wing body of the rigid sail. This results in a high overall weight of the rigid sail. In addition, large and high rigid sails can make it impossible to cross below bridges, power lines or similar structures arranged over busy waters.

PRESENTATION OF THE INVENTION: OBJECT, SOLUTION, ADVANTAGES

It is the object of the present invention to provide a rigid sail or an aerofoil sail, which has a lower overall weight, which is cost-effective to manufacture, and which does not adversely affect a passing under bridges, power lines or similar structures arranged across busy waters. It is furthermore the object of the invention to provide a vessel with a rigid sail or an aerofoil sail, using which the aforementioned advantages are achieved.

In order to solve the problem underlying the invention, a rigid sail for vessels is proposed, in particular, for large ships, such as bulk carriers, tankers, car transporters or bulkers, comprising a mast and a first aerofoil wing body mounted on the mast with a base and a head, wherein the mast is inserted through the base into the first aerofoil wing body and is arranged within the first aerofoil wing body, wherein the mast, starting from the base, does not extend across a maximum height of the first aerofoil wing body, in particular extending less than 75% of the maximum height.

In the context of the present invention, the terms "rigid sail", "aerofoil sail" or "wingsail" can be used interchangeably.

The rigid sail comprises a first aerofoil wing body with a base and a head. The base, also called root, is arranged opposite to the head. When arranged on a vessel, the rigid sail is usually vertically aligned, wherein the base is arranged in the vertical direction below near the body of the ship and wherein the head is arranged in the vertical direction above the base.

For the arrangement of the rigid sail or aerofoil sail on the vessel, a mast is provided, which can be connected to the vessel. In turn, the first aerofoil wing body is arranged on the mast. For this purpose, the mast is inserted through the base or through a lower base plate of the base into the first aerofoil wing body and is mounted within the aerofoil wing body. The first aerofoil wing body has a maximum height. This maximum height is usually the distance between the base, or a base plate of the base, and the head of the aerofoil wing body. Depending on the specific design of the aerofoil wing body, however, the maximum height can also be a different distance.

A particular advantage of the present invention arises from the fact that the mast does not extend from the base across the maximum height of the first aerofoil wing body, in particular, thereby extending across less than 75% of the maximum height. In other words, if the maximum height runs from the base to the head of the aerofoil wing, the mast arranged inside the aerofoil wing body does not extend to the head of the aerofoil wing body, and, in particular, starting from the base, only thereby extending across the lower 75% of the maximum height. The mast is therefore not arranged in the remaining rest of the maximum height up to the head, in particular, not being arranged in the remaining 25% of the maximum height. This upper region, usually the region extending from a first upper end of the mast arranged in the aerofoil wing body to the head of the first aerofoil wing body, is thus a free-standing or self-supporting region of the aerofoil wing body, which is not supported or stabilized by the mast. This measure can reduce the total weight of the rigid sail or the aerofoil sail and make production cheaper. In addition, the mast, which is not arranged above the maximum height of the aerofoil wing body, will reduce the bending pressure on the mast so that the mast can be constructed with less weight and with less use of material. A further advantage of a mast that does not extend beyond the maximum height of the aerofoil wing body is that, in the upper, free-standing or self-supporting region of the aerofoil wing body, the material and thus the weight can be arranged mostly on the outer shell and, thereby, at the most favourable point in order to withstand a bend or bending pressure.

The mast can act as additional support in the lower region of the aerofoil wing body, if the aerofoil wing body is not strong enough in the lower highly stressed region to bear the bending torque. The arrangement of a mast not extending beyond the maximum height of the aerofoil wing body thus leads to a reduced use of material for the mast, as well as to a reduced material use for the outer shell of the aerofoil wing body, because this would otherwise have to be massively reinforced, where applicable, in the lower region of the aerofoil wing body.

Preferably, the rigid sail, when arranged on a vessel, can be rotated by at least 180°, furthermore preferably by at least 270°, and particularly preferably by at least 330°, most preferably, by 360°, in particular around a longitudinal axis of the mast. Due to this particularly free rotatability, the sail can be optimally put in the wind in the case of all prevailing wind conditions in order to achieve a maximum propulsive power for the vessel.

Furthermore, sensors, in particular, wind sensors, can be provided with which the current prevailing wind conditions can be measured. In addition, a control device can be provided, which processes the data received by the sensors, in particular, the wind sensors, and sends control commands to the rigid sail or to an apparatus for controlling the rigid sail. For example, the angle of attack for the rigid sail to the wind can be determined by means of the control device and the rigid sail can be put into the wind accordingly, preferably by means of a motor.

The mast can be formed as an essentially hollow tube, with a preferably circular or rectangular cross-section.

The mast can comprise or consist of a metal, in particular steel, or a composite material, or a carbon-fibre material.

The minimum height of the sail, preferably measured from the base of the sail, or, if arranged on the ship, from the ship's deck, to the tip of the sail is preferably 10 m, furthermore preferably 20 m, particularly preferably at least 30 m. The minimum sail area is preferably at least 200 m², furthermore preferably at least 300 m², most preferably at least 400 m². The rigid sail can have a height, in particular, a maximum height, of at least 50 m, preferably of at least 70 m, particularly preferably of at least 80 m.

The efficiency of the rigid sail can be quantified with the aerodynamic lift-to-drag ratio, i.e. the quotient of the lift coefficient and the resistance coefficient.

Preferably, the rigid sail has an aerodynamic lift-to-drag ratio of at least 4, preferably of at least 7, most preferably of at least 10.

Furthermore, it can be provided that the ratio (sail area $[m^2])^{1/2}/(weight\ [t])^{1/3}$ of the rigid sail is at least 9, preferably at least 11, particularly preferably at least 13.

Being furthermore advantageous, it can be provided that the mast extends across less than 50%, preferably across less than 40%, particularly preferably across less than 35% of the maximum height. This measure can further reduce the weight of the rigid sail and the bending pressure on the mast.

It is of particular advantage if the mast extends only over the lower third of the maximum height measured from the base.

Preferably, it is provided that the mast is mounted on a first end in the first aerofoil wing body in a first bearing, and/or that the mast is mounted in a second bearing that is arranged, in particular, in the region of the base.

The preferred second bearing does not have to be arranged directly in the base of the aerofoil wing body, but can also be located above the base closer to the first bearing, for example, between 5%, preferably 10%, and 30% of the maximum height. Preferably, the first bearing and the second bearing represent a two-point mounting for the aerofoil wing body.

Furthermore, a pivoting device can be provided, wherein the mast is mounted in the pivoting device on a second end facing away from the first aerofoil wing body, wherein the pivoting device is designed to pivot the mast at an angle out of a vertical orientation in a state arranged on the vessel.

A third bearing can be provided for mounting of the mast in the pivoting device. Due to the pivoting device, the rigid sail, in particular the first aerofoil wing body, can be pivoted or tilted out of the vertical orientation. This will make it possible to reduce the vertical height of the rigid sail measured in the vertical direction from the ship's deck. Due to the pivoting device, the rigid sail, in particular, the first aerofoil wing body, can at least partially be lowered so that a passing under structures arranged above a body of water, such as bridges, power lines etc. becomes possible for the vessel.

The second end of the mast is preferably arranged opposite to the first end of the mast, in particular, when viewed in the longitudinal direction of the mast.

Favourably, the angle is at least 45°, preferably at least 60°, particularly preferably at least 80°, most preferably essentially 90°.

If the angle is at least 45°, 60°, 80° or essentially 90°, the rigid sail, in particular, the first aerofoil wing body, can be pivoted from the vertical orientation in such a way that the height of the vessel is significantly reduced and a passing under bridges, power lines, etc. in the area of water bodies is made possible. In particular, if the angle is at least 80° or preferably essentially 90°, the rigid sail can be almost completely lowered.

Being particularly advantageous, it can be provided that the mast has a transverse axle on the second end that is swivel-mounted in an axle receptacle of the pivoting device.

The transverse axle can be formed as a pipe or hollow pipe. The transverse axle is arranged on the lower, second end of the mast preferably at a right angle transversely to the longitudinal axis of the mast. At the end, the transverse axle can be swivel-mounted in an axle receptacle, for example, in an axle bearing of the pivoting device so that the rigid sail, in particular, the first aerofoil wing body, can be pivoted around the transverse axle by means of the pivoting device.

The transverse axle can be considered to be part of the mast or to be part of the pivoting device.

Preferably, it is provided that the pivoting device comprises a partial ring gear arranged on the second end of the mast and a propulsion means that can be arranged on the vessel and engages with the partial ring gear, in particular, a toothed gear or a chain.

The partial ring gear can be formed as a semi-circular, partial 120°- or quarter-circle ring gear. When arranged on the ship, the partial ring gear engages into an assigned propulsion means, in particular, a toothed gear or a chain, which is connected to the ship. By actuating the propulsion means, in particular, the toothed gear or the chain, the partial ring gear is moved and thus, the mast of the rigid sail connected to the partial ring gear is pivoted, whereby a lowering or a pivoting of the rigid sail becomes possible.

Furthermore, the pivoting device can also have two or more partial ring gears, wherein the two or more partial ring gears are preferably arranged next to each other and/or parallel to each other.

Basically, it is also possible that the pivoting device comprises a hydraulic cylinder, a rope winch or the like to allow for a pivoting of the mast or the rigid sail to take place.

Furthermore, the pivoting device can have a guide for the partial ring gear, by means of which, in particular, torques on the rigid sail, which could lead to a contortion of the mast and thus also to a contortion of the partial ring gear, can be absorbed.

For the lowering of the rigid sail, this is preferably first rotated into a 90° orientation to the longitudinal axis of the vessel before the pivoting device is actuated.

Preferably, the first aerofoil wing body of the rigid sail has a leading edge and a trailing edge, and a second aerofoil wing body, in particular, a fin, is arranged in a swivel-mounted manner on the trailing edge of the first aerofoil wing body.

In principle, further aerofoil wing bodies can also be provided, but it is preferred that the rigid sail comprises exactly one, namely the first, aerofoil wing body, or exactly two aerofoil wing bodies pivoting against each other, namely the first aerofoil wing body and the second aerofoil wing body. In particular preferably, no further aerofoil wing body is arranged on the leading edge of the first aerofoil wing body, so that the wind directly flows against the leading edge of the first aerofoil wing body, and/or no further aerofoil wing body is arranged on a trailing edge of the second aerofoil wing body.

Due to the pivoting arrangement of the second aerofoil wing body, in particular, of the fin, on the trailing edge of the first aerofoil wing body, the lift and thus the propulsive power of the rigid sail can be optimized in different wind conditions.

The second aerofoil wing body can also have a leading edge and a trailing edge. Furthermore, the second aerofoil wing body can be lowered or pivoted together with the first aerofoil wing body by means of the pivoting device.

The pivoting of the second aerofoil wing body against the first aerofoil wing body can be made possible by a corresponding adjustment mechanism. The adjustment mechanism can comprise electric motors or internal combustion engines. Furthermore, the adjustment mechanism can have gear rings, toothed gears, chains, hydraulic cylinders, rope pulls or the like.

The second aerofoil wing body is preferably not arranged on the mast, but exclusively on the first aerofoil wing body. Viewed along the profile chord of the first aerofoil wing body, the mast is preferably located approximately in the middle or in the front half of the first aerofoil wing body. Particularly preferably, the mast is arranged spaced away from the leading edge at a position corresponding to approximately 25% to 40%, more preferably 30% to 35%, of the length of the profile chord.

The first and/or the second aerofoil wing body can have a symmetrical or an asymmetric profile, in particular an NACA profile. Furthermore, the first and/or, in particular, the second aerofoil wing body can comprise a cloth sail or be formed as a cloth sail.

Between the first aerofoil wing body and the second aerofoil wing body, a gap substantially parallel to the trailing edge of the first aerofoil wing body and/or the leading edge of the second aerofoil wing body can be provided, which furthermore preferably also remains when pivoting the second aerofoil wing body. By providing a gap, in particular, in the case of extreme angles of attack or strong winds, a stall can be prevented on the first aerofoil wing body and/or on the second aerofoil wing body.

The second aerofoil wing body can also have a base and a head.

Particularly preferably, no winglets or similar are arranged at the head of the first aerofoil wing body and/or the second aerofoil wing body.

Being a further advantage, it can be provided that the second aerofoil wing body has a plurality of segments. Viewed in the direction from the base to the head of the second aerofoil wing body, the segments are preferably arranged on top of each other. It is particularly advantageous if the segments can be pivoted independently of each other with relation to the first aerofoil wing body.

Due to superstructures on the vessel, the flow conditions can change in the vertical direction seen over the height of the rigid sail, in particular, of the first aerofoil wing body and/or of the second aerofoil wing body, so that it is particularly advantageous if the segments are individually controllable to obtain an optimized lift and propulsive power.

Furthermore preferably, it can be provided that the second aerofoil wing body is telescopic, wherein, preferably, an upper segment can be retracted into an adjacently arranged lower segment.

By an upper segment and a lower segment, segments are understood, which are arranged above or below an adjacent segment in the state arranged on the ship. For telescoping the second aerofoil wing body or for reversing a respective upper segment into an adjacent lower segment, the segments are favourably formed as hollow bodies.

Only the lowest segment, which particularly comprises the base of the second aerofoil wing body, is not retractable into another segment. However, it is generally conceivable that this lowest segment can retracted into the ship's body.

Due to the telescopic ability of the second aerofoil wing body, in particular, the fin, the entire sail area is significantly reduced. If only the second aerofoil wing body is telescopic, the mechanics of the rigid sail can overall be kept simple, since the first aerofoil wing body always absorbs most of the bending loads in such a way that the telescopic mechanism does not become jammed. In contrast to fully telescopic rigid sails, a rigid sail, in which only the second aerofoil wing body is telescopic, is mechanically less complex.

Similarly, the first aerofoil wing body can also have segments. Just like the second aerofoil wing body, the segments of the first aerofoil wing body can be pivoted separately and individually. In addition, the first aerofoil wing body can also be telescopic in such a way that the segments of the first aerofoil wing body can be retracted into each other. In this case, the segments of the first aerofoil wing body can also be hollow bodies.

Preferably, however, it is provided that the first aerofoil wing body has segments, which are firmly connected to each other. The embodiment of the first aerofoil wing body with segments is favourable in terms of production, since the individual segments can be produced independently of each other and then attached to each other.

Advantageously, it is provided that the segments, in particular of the second aerofoil wing body, are guided in a rail system.

The rail system can be arranged inside the second aerofoil wing body, at its leading edge or at the trailing edge of the first aerofoil wing body. The segments of the second aerofoil wing body are extended and retracted along the rail system. If the rail system is arranged inside the second aerofoil wing body, it can be provided that the rail system is also telescopic. Also, a rigid rail can be arranged on the trailing edge of the first aerofoil wing body, on which the telescopic segments of the second aerofoil wing body run.

Being a further advantage, the first aerofoil wing body and/or the second aerofoil wing body has/have ribs and/or struts. The first and/or second aerofoil wing body can preferably be constructed similar to an aircraft wing. The ribs run parallel to the profile chord of the first and/or the second aerofoil wing body and can be arranged at intervals of at least 1 m, preferably of at least 1.5 m, particularly preferably of at least 2 m. The longitudinal struts, which are preferably arranged at a right angle to the ribs, can have a distance of at least 1 m, preferably of at least 2 m. Two, three or more struts can be provided.

Preferably, the ribs and/or the struts are arranged with respect to the maximum height in the region in which the mast is arranged inside the first aerofoil wing body.

The ribs and struts then represent a certain reinforcement in this region; in addition, the ribs and/or struts can preferably also be arranged across the entire height of the first and/or the second aerofoil wing body and thus reinforce the entire first and/or second aerofoil wing body. Particularly preferably, the struts, or at least one strut, are arranged across the entire height of the first and/or the second aerofoil wing body, and furthermore, in particular, up to the head of the first and/or the second aerofoil wing body.

In addition, further reinforcement devices can be provided, in particular, in the region of the mast.

The first aerofoil wing body and/or the second aerofoil wing body can have an outer shell, wherein the outer shell is, in particular, designed to be stiff and, furthermore preferably, has an aluminium-sandwich structure or a fibreglass structure. The outer shell forms the side walls of the respective aerofoil wing body.

In the case of an aluminium-sandwich structure, the outer shell has two outer plates, in particular, aluminium plates, wherein there is another aluminium structure between the two plates, which is designed in the form of a corrugated sheet.

In particular, an aluminium-sandwich structure has a particularly high level of strength and/or stability while simultaneously having an extremely low weight.

In principle, however, it is also conceivable that the outer shell of the first aerofoil wing body and/or the second aerofoil wing body consist(s) of a steel or a composite material or a carbon-fibre material or a textile, for example, a canvas.

Preferably, it is provided that the rigid sail, in particular, the first aerofoil wing body and/or the second aerofoil wing body, taper(s) in the direction of the head.

In a lateral view, the rigid sail is approximately triangular in shape at least in sections. The tapering design of the first and/or the second aerofoil wing body achieves aerodynamic advantages. In particular, an elliptical lift distribution is provided, which enables a high propulsive power with simultaneously low bending loads.

Preferably, the rigid sail can be retrofitted in vessels, wherein the bridge of the vessels is preferably arranged in the front or bow area of the ship.

Being a further advantage, the first aerofoil wing body and/or the second aerofoil wing body has/have a predetermined breaking point, wherein the predetermined breaking point is arranged in particular above the mast, further in particular above the first bearing.

Due to the large sail area of the rigid sail, in the case of strong winds, high-level bending loads can act on the sail. These can result in damage to the structure of the vessel. There is also a risk that the vessel will capsize. For this purpose, a predetermined breaking point can be provided, which ensures that the upper part of the rigid sail, in particular, of the first aerofoil wing body and/or of the second aerofoil wing body break(s) away under an excessively high bending pressure, so that damage to the structure of the ship or vessel, or a capsizing of the ship or vessel, is avoided.

For example, the predetermined breaking point can be provided by a perforation or a material thinning.

Particularly preferably, the first aerofoil wing body has a base plate in the base and the second aerofoil wing body has a base plate in the base, wherein the base plate of the second aerofoil wing body is at an angle to the base plate of the first aerofoil wing body.

This leads to an increase in the clearance height below the second aerofoil wing body and to an avoidance of collisions with deck structures on the vessel. Furthermore, by the bevelling of the base of the second aerofoil wing body, the rigid sail can be pivoted by a small angle from the vertical position without having to rotate the rigid sail first.

Another solution to the task underlying the invention is in providing a vessel with a previously described rigid sail.

In particular, the vessel can have a plurality of rigid sails.

Furthermore, the pivoting device can be arranged at least partially in the ship's hull to allow a space-saving arrangement.

Particularly preferably, the vessel is a large ship, such as a tanker, a bulk carrier, a car transporter or a bulker. In particular, the vessel preferably is not a container ship.

Another solution is to provide a previously described pivoting device for a previously described rigid sail.

SHORT DESCRIPTION OF THE FIGURES

The invention will be described in more detail based on the accompanying figures. The figures show.

DETAILED DESCRIPTION OF THE FIGURES

Figure 1:
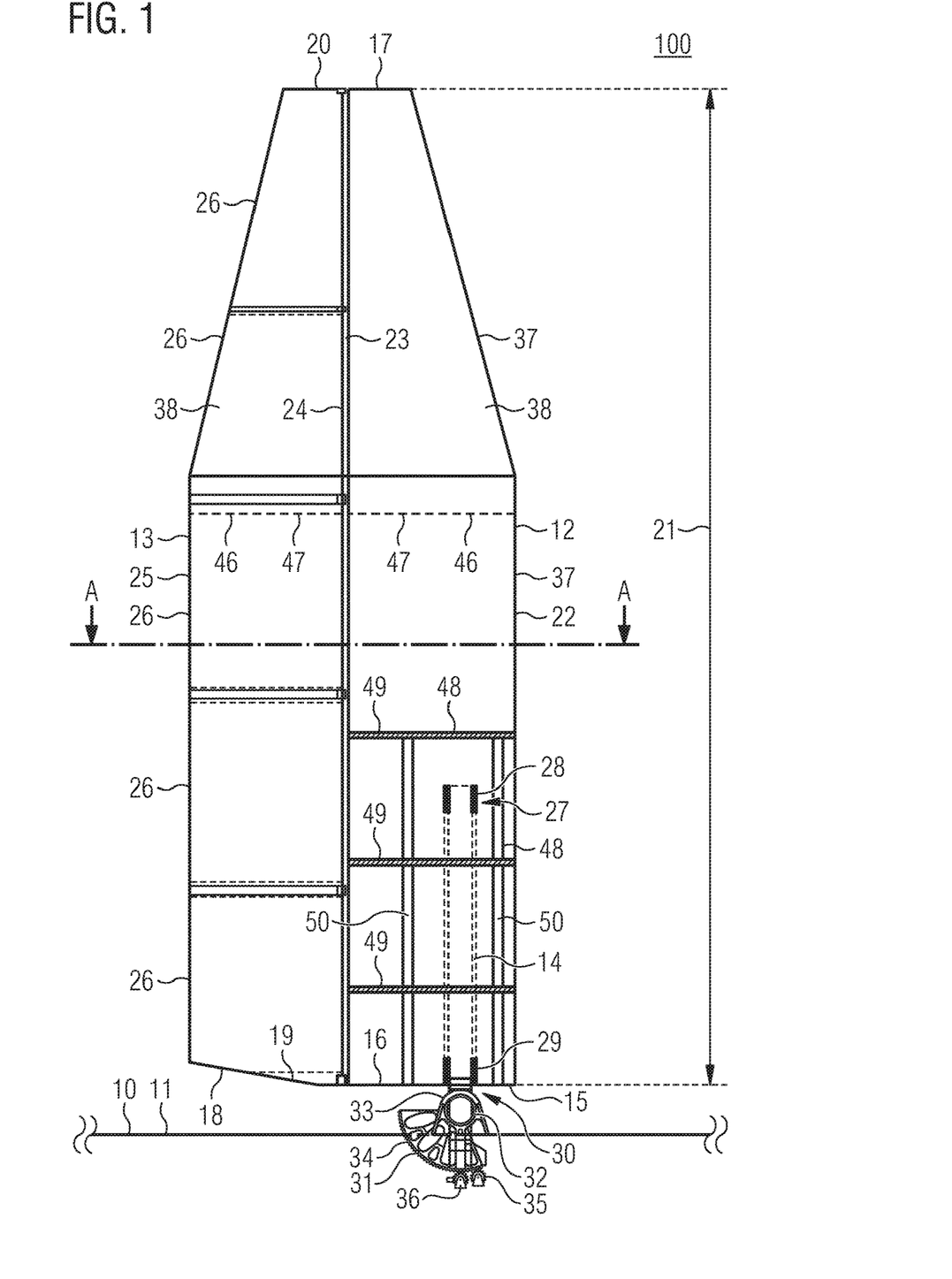
FIG. 1 a lateral view of a rigid sail,
FIG. 2 a cross-section through the rigid sail.
Figure 5:
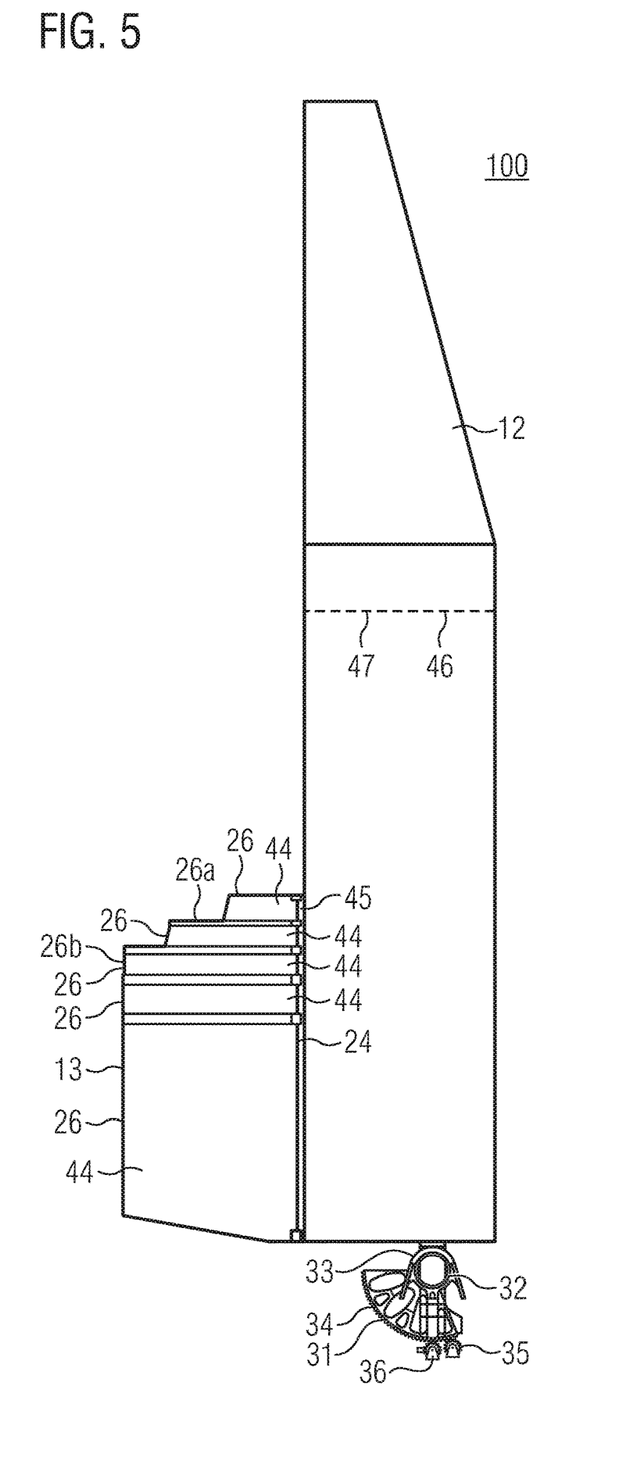

FIG. 1 shows a rigid sail 100, which is arranged on a vessel 10. Of the vessel, only the ship's deck 11 is shown. The rigid sail 100 is shown in a lateral view and comprises a first aerofoil wing body 12 and a second aerofoil wing body 13. The first aerofoil wing body 12 is connected to the ship's deck 11 via a mast 14. The first aerofoil wing body 12 has a first base 15 with a first base plate 16 and a first head 17. Analogously, the second aerofoil wing body 13 comprises a second base 18 with a second base plate 19 and a second head 20. The mast 14 is introduced through the first base 15 or the first base plate 16 into the first aerofoil wing body 12 and is arranged within the first aerofoil wing body 12. Starting from the first base 15, the mast 14 extends across about one third of the maximum height 21 measured between the first base 15 and the first head 17. Furthermore, the first aerofoil wing body 12 and the second aerofoil wing body 13 have a respective leading edge 22, 24 and a trailing edge 23, 25. The second aerofoil wing body 13 is arranged on the trailing edge 23 of the first aerofoil wing body 12 in a in a pivotable manner. In this case, the second aerofoil wing body 13 is solely mounted on the first aerofoil wing body 12 and, in particular, not mounted on the mast 14. The second aerofoil wing body 13 has segments 26, which, as shown in FIG. 5, are telescopic. The mast 14 is mounted on a first end 27 in a first bearing 28 in the first aerofoil wing body 12. A second mounting of the mast 14 takes place in a second bearing 29 in the region of first base 15 of the first aerofoil wing body 12. The segments 26 of the second aerofoil wing body 13 can be individually pivoted independently of each other with relation to the first aerofoil wing body 12. Furthermore, the rigid sail can be rotated 360° around the mast 14.

On a second end 30, which is opposite the first end 27 of the mast 14, a pivoting device 31 is arranged, which is arranged at least partially below the ship's deck 11. For the mounting of the mast 14 on the pivoting device 31, the mast 14 has a transverse axle 32 on the second end 30, which is swivel-mounted in an axle receptacle 33 of the pivoting device 31. Furthermore, a partial ring gear 34 is arranged on the second end 30 of the mast 14, which partial ring gear 34 is engaged with a propulsion means comprising at least one toothed gear 35. By actuating the propulsion means 36, the partial ring gear 34 is rotated around the axle receptacle 33, so that also the mast 14 connected to the partial ring gear 34 and, consequently, the entire rigid sail 100 is pivoted around the transverse axle 32 or the axle receptacle 33. This allows the rigid sail 100 to be lowered. For laying the rigid sail 100, the rigid sail 100, in particular, the first aerofoil wing body 12 or the second aerofoil wing body 13 is initially rotated by 90° around the mast 14 out of the orientation shown in FIG. 1. Subsequently, the rigid sail 100 can be lowered by up to 90° by means of the pivoting device 31. In particular, for smaller pivots and to avoid obstructions by deck structures, the second base 18 of the second aerofoil wing body 13 is slanted, or the second base plate 19 of the second aerofoil wing body 13 is at an angle to the first base plate 16 of the first aerofoil wing body 12. The first aerofoil wing body 12 also has segments 37, which are, however, firmly connected to each other. Furthermore, both the first aerofoil wing body 12 as well as the second aerofoil wing body 13 have an outer shell 38. The first aerofoil wing body 12 and the second aerofoil wing body 13 have a wing outline tapering upwards to the respective head 17, 20.

Figure 2:
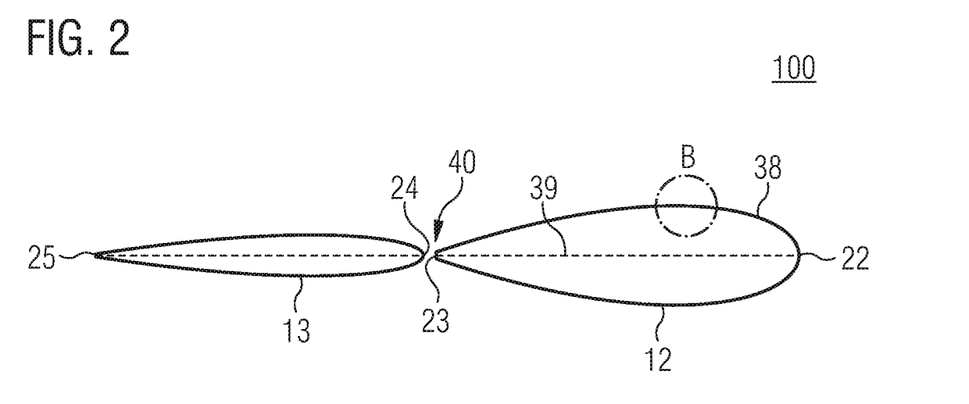

FIG. 2 shows a cross-section through level A-A in accordance with FIG. 1. The first aerofoil wing body 12 has a leading edge 22 and a trailing edge 23, between which the profile chord 39 runs. The second aerofoil wing body 13 is arranged on the trailing edge 23 of the first aerofoil wing body 12. Between the first aerofoil wing body 12 and the second aerofoil wing body 13, a gap 40 is formed.

Figure 3:
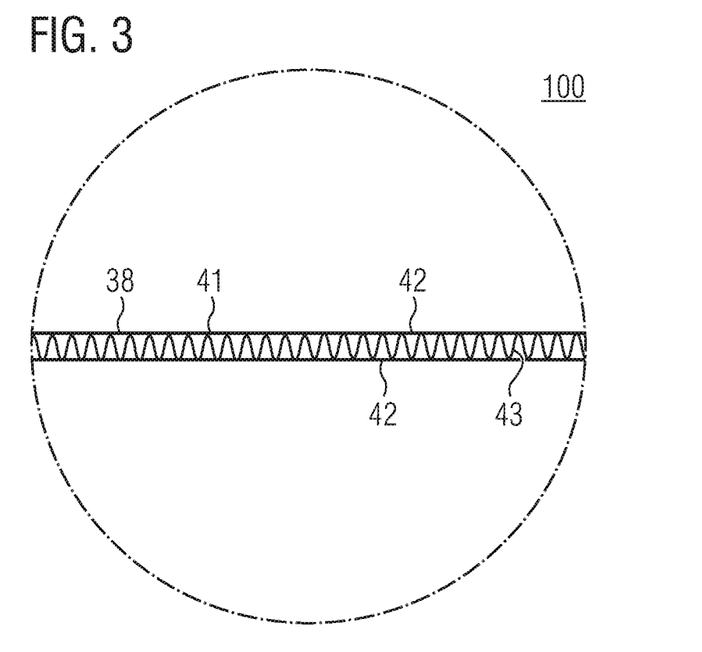
FIG. 3: an outer shell of the rigid sail in a cross-sectional view.

FIG. 3 shows a cross-section in region B in accordance with FIG. 2 through the outer shell 38 of the first aerofoil wing body 12. The outer shell 38 comprises an aluminium-sandwich structure 41, in which a corrugated aluminium sheet 43 is arranged between two aluminium plates 42.

Figure 4:
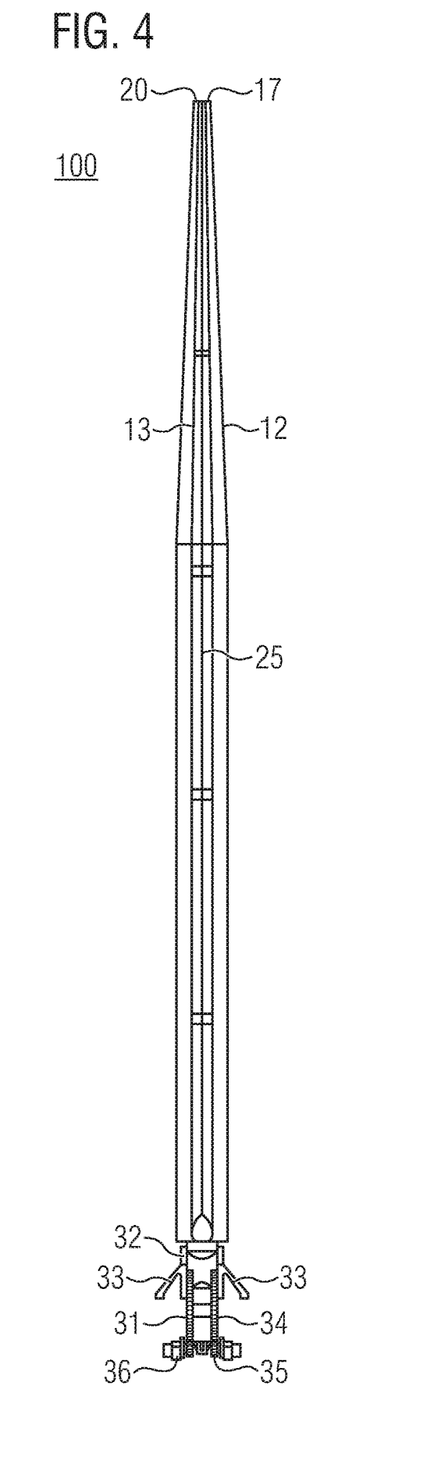
FIG. 4: a back view of the rigid sail,
FIG. 5 a rigid sail with a telescopic fin.

FIG. 4 shows a back view of the rigid sail 100. The rigid sail 100 or the first aerofoil wing body 12 and the second aerofoil wing body 13 also taper to the head 17, 20 in the frontal profile.

FIG. 5 shows another lateral view of the rigid sail 100. The second aerofoil wing body 13 is designed to be telescopic, wherein an upper segment 26a can be respectively inserted into a lower segment 26b. For this purpose, the segments 26, 26a, 26b are formed as hollow bodies 44. For moving and inserting the respective upper segment 26a and the respective lower segment 26b, a rail system 45, which is also telescopic, is provided on the leading edge 24 of the second aerofoil wing body 13. Alternatively, a rigid rail can be arranged on the trailing edge 23 of the first aerofoil wing body 12, on which the telescopic segments 26, 26a, 26b run.

As is furthermore shown in FIGS. 1 and 5, at least the first aerofoil wing body 12 and the second aerofoil wing body 13 have a predetermined breaking point 46 above the first end 27 or the first bearing 28 of the mast 14. The predetermined breaking point 46 can be implemented, for example, by means of a perforation 47 of the first aerofoil wing body 12 or the second aerofoil wing body 13.

Returning to FIG. 1, reinforcement elements 48 for the first aerofoil wing body 12 are shown. The reinforcement bodies 48 are formed as ribs 49 arranged from the leading edge 22 to the trailing edge 23 of the first aerofoil wing body 12 and as struts 50 running vertically and being orientated approximately parallel to the mast 14. The ribs 49 and struts 50 are only shown in the lower third in the region of the mast 14. It is preferred, however, that the ribs 49 and struts 50 extend up to the head 17 of the first aerofoil wing body 12, thereby decreasing in density, and, if the second aerofoil wing body 13 has ribs and/or struts, that they also extend up to the head 20 of the second aerofoil wing body 13.

Figure 6:
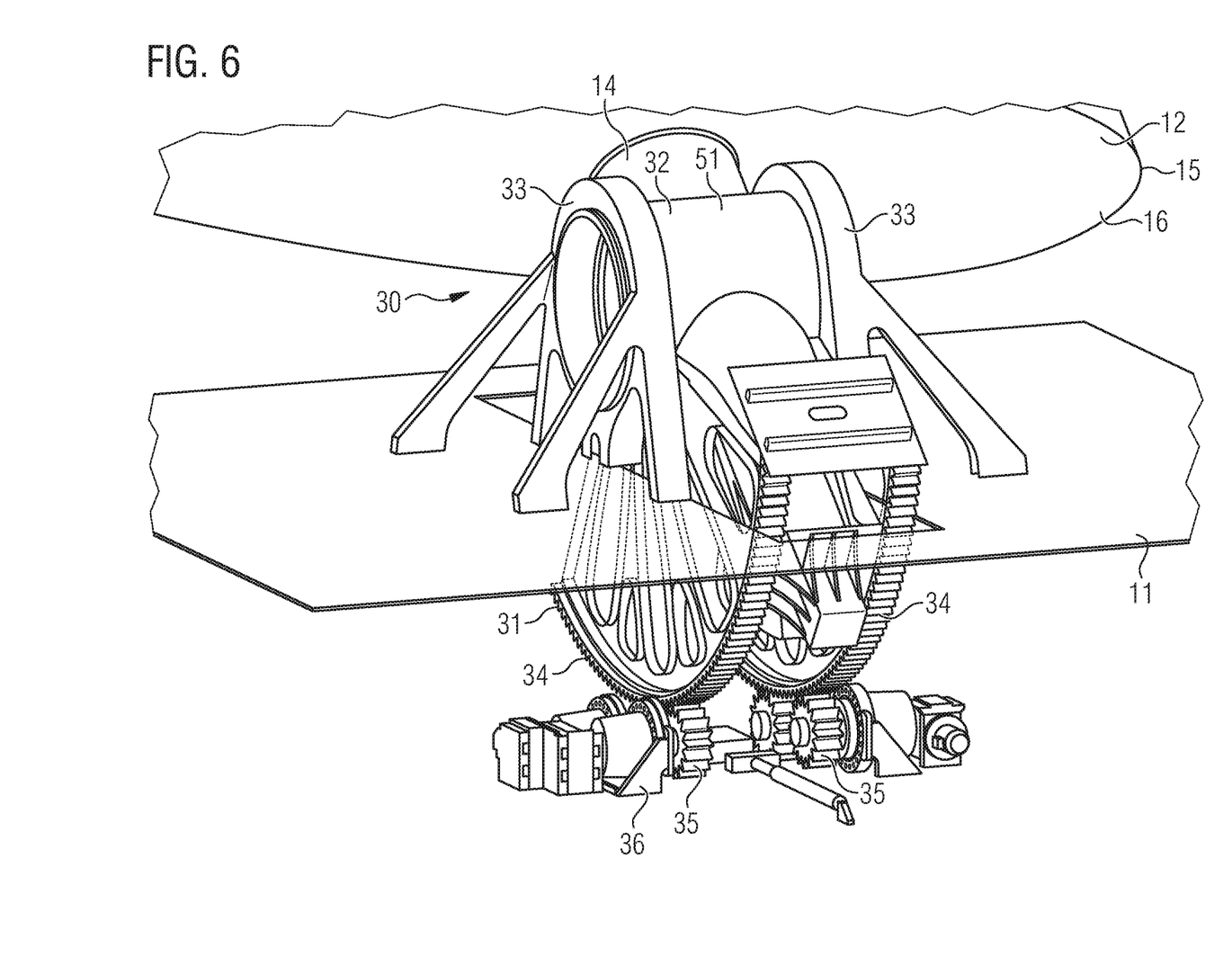
FIG. 6: a pivoting device.

FIG. 6 shows the pivoting device 31. The mast 14 is guided through the first base plate 16 of the first base 15 of the first aerofoil wing body 12. A transverse axle 32 in the form of a hollow tube 51 is arranged on the second end 30 of the mast 14. At the end, the hollow tube 51 is arranged in an axle receptacle 33. Furthermore, on the second end 30 of the mast 14, there is a partial ring gear 34. The pivoting device 31 also comprises a propulsion means 36, which comprises toothed gears 35. Due to the propulsion of the toothed gears 35, the partial ring gear 34 is pivoted around the transverse axle 32 mounted in the axle receptacle 33 and thus, also the mast 14 and the first aerofoil wing body 12 attached to the mast 14 together with the second aerofoil wing body 13 attached to it are lowered.

The invention claimed is:

1. Rigid sail for vessels comprising a mast and a first aerofoil wing body mounted on the mast with a base and a head, wherein the mast is inserted through the base into the first aerofoil wing body and is arranged within the first aerofoil wing body, wherein the mast, starting from the base, does not extend across a maximum height of the first aerofoil wing body, wherein a pivoting device is provided, wherein the mast is mounted on a second end facing away from the first aerofoil wing body in the pivoting device, wherein the pivoting device is designed to pivot the mast, when arranged on a vessel, at an angle out of a vertical orientation, wherein the mast has a transverse axle on the second end, which is swivel-mounted in an axle receptacle of the pivoting device.

2. Rigid sail according to claim 1, wherein the mast extends across less than 35%, of the maximum height.

3. Rigid sail according to claim 1, wherein the mast is located on a first end in the first aerofoil wing body in a first bearing, and wherein the mast is mounted in a second bearing arranged in a region of the base.

4. Rigid sail according to claim 1, wherein the pivoting device comprises a partial ring gear arranged on the second end of the mast and a propulsion means that can be arranged on the vessel and engages with the partial ring gear.

5. Rigid sail according to claim 1, wherein the first aerofoil wing body has a leading edge and a trailing edge and that a second aerofoil wing body is arranged on the trailing edge of the first aerofoil wing body in a swivel-mounted manner.

6. Rigid sail according to claim 5, wherein the second aerofoil wing body has a plurality of segments.

7. Rigid sail according to claim 6, wherein the segments can be pivoted independently of each other with relation to the first aerofoil wing body.

8. Rigid sail according to claim 6, wherein the second aerofoil wing body is telescopic, wherein one upper segment can be respectively retracted into an adjacently arranged lower segment.

9. Rigid sail according to claim 6, wherein the segments are guided in a rail system.

10. Rigid sail according to claim 1, wherein the first aerofoil wing body has ribs or struts.

11. Rigid sail according to claim 1, wherein the first aerofoil wing body or the second aerofoil wing body has an outer shell, wherein the outer shell comprises an aluminium-sandwich structure or a fibreglass structure.

12. Rigid sail according to claim 1, wherein the rigid sail taper(s) in the direction of the head.

13. Rigid sail according to claim 1, wherein the first aerofoil wing body or the second aerofoil wing body has a predetermined breaking point above the mast.

14. Rigid sail according to claim 1, wherein the pivoting device comprises a hydraulic cylinder.

15. Rigid sail according to claim 4, wherein the propulsion means is a toothed gear or a chain.

16. Vessel with a rigid sail, said rigid sail comprising a mast and a first aerofoil wing body mounted on the mast with a base and a head, wherein the mast is inserted through the base into the first aerofoil wing body and is arranged within the first aerofoil wing body, wherein the mast, starting from the base, does not extend across a maximum height of the first aerofoil wing body, wherein a pivoting device is provided, wherein the mast is mounted on a second end facing away from the first aerofoil wing body in the pivoting device, wherein the pivoting device is designed to pivot the mast at an angle out of a vertical orientation, wherein the mast has a transverse axle on the second end, which is swivel-mounted in an axle receptacle of the pivoting device.

17. Pivoting device with a rigid sail, said rigid sail comprising a mast and a first aerofoil wing body mounted on the mast with a base and a head, wherein the mast is inserted through the base into the first aerofoil wing body and is arranged within the first aerofoil wing body, wherein the mast, starting from the base, does not extend across a maximum height of the first aerofoil wing body, wherein the pivoting device comprises an axle receptacle, wherein the mast is swivel-mounted in the axle receptacle of a pivoting device with a transverse axle on a second end of the mast, the second end facing away from the first aerofoil wing body, wherein the pivoting device is designed to pivot the mast, when arranged on the vessel, at an angle out of a vertical orientation.

* * * * *